United States Patent [19]

Sato et al.

[11] Patent Number: 5,264,677
[45] Date of Patent: Nov. 23, 1993

[54] WELDING START POSITION DETECTING APPARATUS FOR WELDING ROBOT

[75] Inventors: Takayuki Sato, Koga; Toshio Maeda, Oyama, both of Japan

[73] Assignee: Kabushiki Kaisha Komatsu Seisakusho, Tokyo, Japan

[21] Appl. No.: 2,882

[22] Filed: Jan. 11, 1993

[30] Foreign Application Priority Data

Jan. 13, 1992 [JP] Japan ................................ 4-003700

[51] Int. Cl.$^5$ ............................................. B23K 9/12
[52] U.S. Cl. .................................. 219/124.34; 901/42; 901/46
[58] Field of Search .................. 219/124.34, 125.1; 901/42, 46

[56] References Cited

U.S. PATENT DOCUMENTS 4,249,062 2/1981 Hozumi et al. ................. 219/124.34
4,538,047 8/1985 Nakano et al. ................. 219/124.34

FOREIGN PATENT DOCUMENTS 205879 8/1989 Japan .

*Primary Examiner*—Clifford C. Shaw
*Attorney, Agent, or Firm*—Diller, Ramik & Wight

[57] ABSTRACT

A welding start position detecting apparatus for a welding robot in which a first reference voltage and a second reference voltage having different voltage levels are set as comparison reference voltages in which, during a preset time period after start of searching operation, a voltage for detection of the welding start position is compared with the first reference voltage having a higher sensitivity and, when the welding start position detecting voltage comes across a level of the first reference voltage, the first reference voltage is switched to the second reference voltage having a lower sensitivity for comparing operation of the welding start position detecting voltage with the second reference voltage to thereby enable the detection of the welding start position on a base material even when an impedance around a welding torch changes.

2 Claims, 4 Drawing Sheets

WELDING START POSITION DETECTING APPARATUS FOR WELDING ROBOT

BACKGROUND OF THE INVENTION

1. Field of the Invention

The present invention relates to a welding start position detecting apparatus for a welding robot.

2. Description of the Related Art

An ordinary welding robot has a function of correcting a shift between an actual welding start position and a target welding start position.

FIG. 4 shows a prior art arrangement of such an apparatus in which, in a welding start position detecting operation, a welding start position detecting voltage V generated at a start position detecting voltage generating circuit 1 is applied to a welding wire 2, under which condition a robot is driven to bring a tip end of the welding wire into contact with a welding start position on a base material 3.

The voltage V applied to the welding wire 2 is sampled and applied to a terminal A of a comparison circuit 4. The comparison circuit 4 compares the applied voltage V with a predetermined reference voltage Vr received from a reference voltage generating circuit 5 and outputs a start position detection signal when the voltage V becomes lower than the reference voltage Vr.

Since the base material 3 is grounded, when the welding wire 2 comes into contact with the base material 3, the voltage signal V applied to the comparison circuit 4 becomes zero. The reference voltage Vr is previously set to a value between the voltage generated when the welding wire 2 comes into contact with the base material 3 and the voltage when the welding wire 2 does not come into contact with the base material 3. In the normal case, when the welding wire 2 comes into contact with the base material 3, the voltage signal V becomes lower than the reference voltage, which results in that the comparison circuit 4 outputs a start position detection signal.

A robot controller 6 stops the robot when receiving the detection signal from the comparison circuit 4, calculates on the basis of angles of respective axes of the robot a welding start position at which the welding wire 2 contacts with the base material 3, compares the calculated value with a target welding start position previously set to find a shift therebetween, and corrects the position of the robot according to the calculated shift.

With such a prior art system as mentioned above, since an impedance around a welding torch largely varies due to the adhesion of spatter, the leakage of cooling water, the reduction of insulation of the cooling water, etc., even when the identical voltage is generated from the detecting-voltage generation circuit 1, the voltage V applied to the comparison circuit 4 is varied.

For this reason, the prior art system has such a disadvantage that, when the detection voltage V is largely lowered, the comparison circuit 4 outputs the detection signal in spite of the fact that the welding wire 2 does not come into contact with the base material 3, whereby it becomes impossible to distinguish whether the welding start position is actually detected or not.

It is an object of the present invention to provide an apparatus for detecting a welding start position in a welding robot which, even when an impedance around a welding torch changes, can maximize the possibility of detecting a welding start position on a base material so as to improve the working efficiency of a welding robot.

SUMMARY OF THE INVENTION

In accordance with an aspect of the present invention, there is provided an apparatus for detecting a welding start position in a welding robot wherein, while a predetermined voltage for detection of the welding start position is applied to a welding wire, the robot is driven to perform its searching operation of the welding start position on a base material, the applied voltage is compared with a predetermined reference voltage and, on the basis of a comparison result, a time point when the welding wire comes into contact with the welding start position on the base material is detected and, a shift between an actual welding start position found on the basis of angles of respective axes of the robot at the contact detection time point and a preset target welding start position is calculated to correct the position of the robot, the apparatus comprising: reference voltage setting means for setting, as the predetermined reference voltage for comparison, a first reference voltage having a higher sensitivity and a second reference voltage having a lower sensitivity; first welding start position detecting means for comparing the applied voltage with the first reference voltage during a period from the start of searching until the expiration of a predetermined time, for switching the first reference voltage to the second reference voltage when the applied voltage comes across a level of the first reference voltage to perform the comparison operation of the applied voltage with the second reference voltage and, for detecting a time point when the applied voltage comes across a level of the second reference voltage as a time point when the welding wire comes into contact with the welding start position on the base material; and second welding start position detecting means for comparing the applied voltage with the first reference voltage when the predetermined time expires while the applied voltage does not come across the level of the first reference voltage and, for detecting a time point when the applied voltage comes across the level of the first reference voltage as the time point when the welding wire comes into contact with the welding start position on the base material.

With such an arrangement of the present invention, the applied voltage is compared with the reference voltage having the higher sensitivity by utilizing a slight time before the welding wire comes into contact with the base material and, when the applied voltage comes across the level of the reference voltage having the higher sensitivity, the reference voltage is switched to the reference voltage having the lower sensitivity to compare the applied voltage with the reference voltage having the lower sensitivity so as to detect a time point when the applied voltage comes across the level of the reference voltage having the lower sensitivity as the time point when the welding wire comes into contact with the welding start position on the base material. Thus, even when the impedance around the welding torch is somewhat reduced, the apparatus can detect the welding start position on the base material.

In this way, in the present invention, when the voltage comes across the level of the reference voltage in the slight time before the searching operation of the welding start position, the reference voltage is switched to a reference voltage of the lower sensitivity to perform welding start position detecting operation. Thus, even when the impedance around a welding torch is largely changed by the adhesion of spatter, the leakage of cooling water, the reduction of insulation of the cooling water, etc., the welding start position can be detected and thus the working efficiency of the robot can be improved.

In accordance with another aspect of the present invention, there is provided an apparatus for detecting a welding start position in a welding robot wherein, while a predetermined voltage for detection of the welding start position is applied to a welding wire, the robot is driven to perform its searching operation of the welding start position on a base material, a time point when the welding wire comes into contact with the base material is detected, and a shift between an actual welding start position found on the basis of angles of respective axes of the robot at the contact detection time point and a preset target welding start position is calculated to correct the position of the robot, the apparatus comprising: differentiating means for differentiating the applied voltage; reference value setting means for setting a predetermined reference value for comparison; and comparison means for comparing an output of the differentiating means with the reference value set by the reference value setting means and for outputting a start position detection signal when the output of the differentiating means exceeds the set reference value.

With such an arrangement, the voltage applied to the welding wire is differentiated by the differentiating means and, when the differentiated value exceeds the predetermined reference value, the start position detection signal is output. Accordingly even when the impedance around the welding torch is varied and thus a voltage difference between the voltage before the welding torch comes into contact with the base material and the voltage after the welding torch comes into contact with the base material becomes small, a differentiated output can be obtained as long as a difference between the before-contact voltage and the after-contact voltage exists. Thus, even in such a case, when the reference value for comparison is set at a suitable level, the welding start position can be detected.

DESCRIPTION OF THE PREFERRED EMBODIMENTS

The present invention will be detailed by referring to embodiments shown in the attached drawings.

Figure 1:
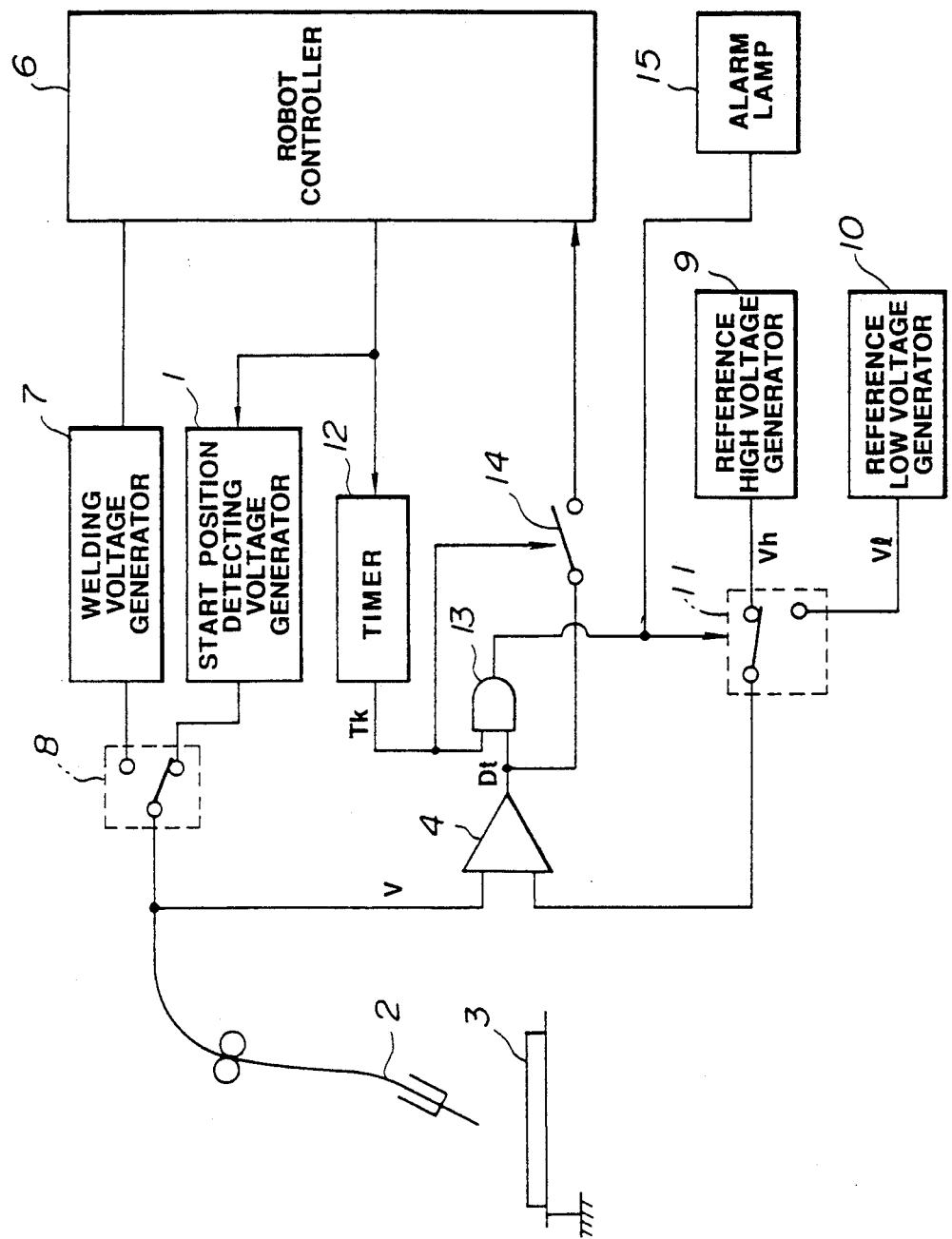
FIG. 1 is a block diagram of an embodiment of the present invention.
Figure 4:
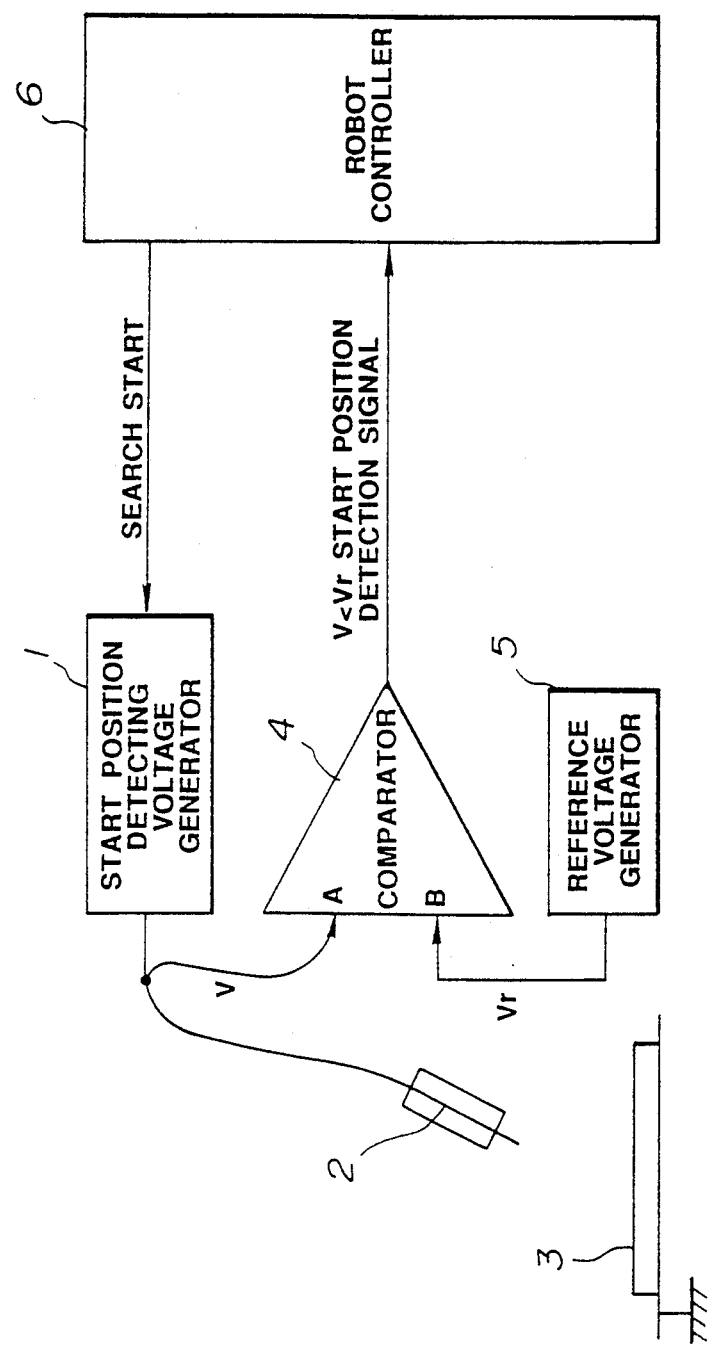
FIG. 4 is a block diagram of a prior art.

Referring first to FIG. 1, there is shown a first embodiment of the present invention, in which constituent elements having the same functions as those in the arrangement of FIG. 4 are denoted by the same reference numerals.

A detecting-voltage generation circuit 1 generates a start position detecting voltage as high as about 400 V, and a welding-voltage generation circuit 7 generates a welding voltage of about 30 V. When it is desired to detect a welding start position, one of contacts of a switch circuit 8 is connected to the detecting-voltage generation circuit 1. A voltage applied to a welding wire 2 is changed to a voltage V of a suitable level and applied to one input terminal of a comparison circuit 4. The comparison circuit 4 in turn compares the applied voltage V with a high voltage Vh (that has nearly the same value as the reference voltage Vr supplied from the reference voltage generation circuit 5 in FIG. 4) supplied from a reference high voltage generation circuit 9 or with a low voltage V1 (V1<Vh) supplied from a reference low-voltage generation circuit 10, and outputs a start position detection signal Dt having a high (H) level when the voltage V becomes lower than the reference high voltage Vh or the reference low voltage V1. In this embodiment, the voltage V maintains a suitable level of positive polarity when the welding wire 2 does not come into contact with the base material 3 and becomes 0 when the welding wire 2 comes into contact with the base material 3.

Previously set in a timer 12 is a very small time (120 to 130 msec.) shorter than a minimum time considered necessary from the start of searching of a welding start position until the welding wire 2 comes into contact with the base material 3. More specifically, the timer 12 starts its time measuring operation as soon as the timer 12 receives a search start command from a robot controller 6, and outputs a measured time-period signal Tk which holds a high level only during the measuring period of the aforementioned preset time.

An AND gate 13 performs logical "AND" operation of the start position detection signal Dt and the measured time-period signal Tk and outputs its logical "AND" result to switch circuit 11 and an alarm lamp 15.

Contacts of the switch circuit 11 are controllably switched according to an output of the AND gate 13. More in detail, in its initial state, the switch circuit 11 is connected to the reference high-voltage generation circuit 9 and, when the output of the AND gate is changed to its high (H) level, that is, only when the timer 12 is in its time measuring period and the output Dt of the comparison circuit 4 is changed to its high level, the switch circuit 11 is switched to be connected to the reference low-voltage generation circuit 10. However, after the switch circuit 11 is once switched to be connected to the reference low-voltage generation circuit 10, the switch circuit 11 keeps its state regardless of the output of the AND gate.

In its initial state, the contact of the switch circuit 14 is opened. When the output of the AND gate 13 is low (L) level, that is, when the time measuring period expires, the contact of the switch circuit 14 is closed so that the output of the comparison circuit 4 is connected to the robot controller 6.

The alarm lamp 15, which comprises a light emitting diode (LED) or the like, is used to inform an operator of the fact that the impedance around the welding torch is changed.

Figure 2:
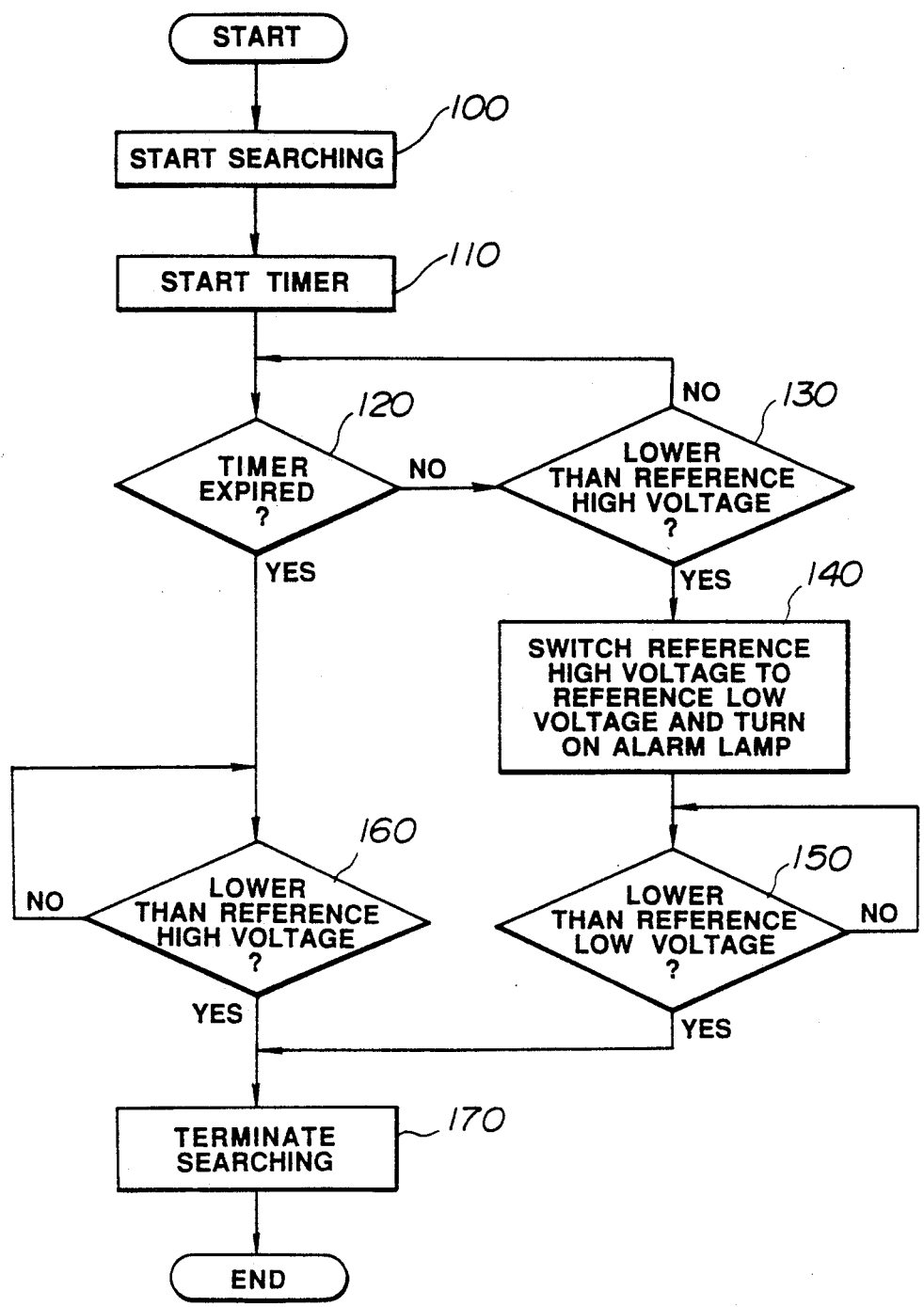
FIG. 2 is a flowchart for explaining the operation of the embodiment.

The operation of the arrangement of the foregoing embodiment will be explained by referring to a flowchart of FIG. 2.

As the searching operation of the welding start position is started, the robot controller 6 issues a search start command to the detecting-voltage generation circuit 1 and the timer 12. The detecting-voltage generation circuit 1, when receiving the search start command from the robot controller 6, applies the start position detecting voltage to the welding wire 2, while the timer 12, when receiving the command from the robot controller 6, starts its time measuring operation (steps 100 and 110).

At the time point of starting the search, the switch circuit 11 is connected to the reference high-voltage generation circuit 9 as already explained above.

Accordingly, during the measuring period of the predetermined set time of the timer 12, the reference high voltage Vh is input to the comparison circuit 4 to be compared with the voltage V. In this comparison, when the voltage V is not lower than the reference high voltage Vh, the comparison circuit 4 repetitively performs its comparing operation until the set time of the timer 12 expires (steps 120 and 130).

When the voltage V becomes lower than the reference high voltage Vh during the time measuring period of the timer 12, on the other hand, the comparison circuit 4 outputs the start position detection signal Dt having a high level. At this time, however, since the contact of the switch circuit 14 is opened, the start position detection signal is not transmitted to the robot controller 6. At the same time, since the measured time-period signal Tk is at its high level, the output of the start position detection signal Dt of high level from the comparison circuit 4 causes the AND gate 13 to issue a high level (H) signal. As a result, the switch circuit 11 is switched to be connected to the reference low-voltage generation circuit 10 and the alarm lamp 15 is turned on to alarm the change in the impedance around the welding torch (step 140).

The operator can recognize the impedance change of the welding torch by the lighted alarm lamp and can know the necessity of cleaning of the welding torch or change of the cooling water.

Thereafter, the comparison circuit 4 compares the voltage V with the reference low voltage Vl and, when the voltage V becomes lower than the reference low voltage Vl, issues the start position detection signal Dt of high level (step 150). When the timer 12 expires its time measuring period, the contact of the switch 14 is closed, so that the start position detection signal Dt is input to the robot controller 6.

When receiving the start position detection signal from the comparison circuit 4, the robot controller 6 stops the robot to terminate its searching operation, calculates the welding start position at which the welding wire 2 comes into contact with the base material 3 on the basis of angles of respective axes of the robot, compares the calculated welding start position with the preset target welding start position to find a shift therebetween, and corrects the robot welding starting position according to the calculated shift (step 170).

When the voltage V does not become lower than the reference high voltage Vh during the time measuring period of the timer 12, the contact of the switch circuit 14 is closed upon expiration of the time measuring period previously set in the timer 12, while the switch 11 is still connected to the reference high-voltage generation circuit 9. Therefore, the comparison circuit 4 compares the voltage V with the reference high voltage Vh and when the voltage V becomes lower than the reference high voltage Vh, outputs the start position detection signal Dt of high level (step 160). The detection signal Dt is input to the robot controller 6, at which time the searching operation is completed (step 170).

In the above embodiment, if the voltage before contacting to the base material is set to have the negative polarity, the voltage V is compared with the reference low voltage and, when the voltage V comes across the level of the reference low voltage within the preset time of the timer 12, the reference low voltage is switched to the reference high voltage. When the voltage V comes across the level of the reference high voltage, it is detected that the welding wire comes into contact with the welding start position on the base material.

More specifically, the reference voltage is first set to be the voltage having the higher sensitivity and, when the comparison condition of the voltage V and the reference high voltage is satisfied within the predetermined time, the reference voltage is switched to the voltage having the lower sensitivity.

Figure 3:
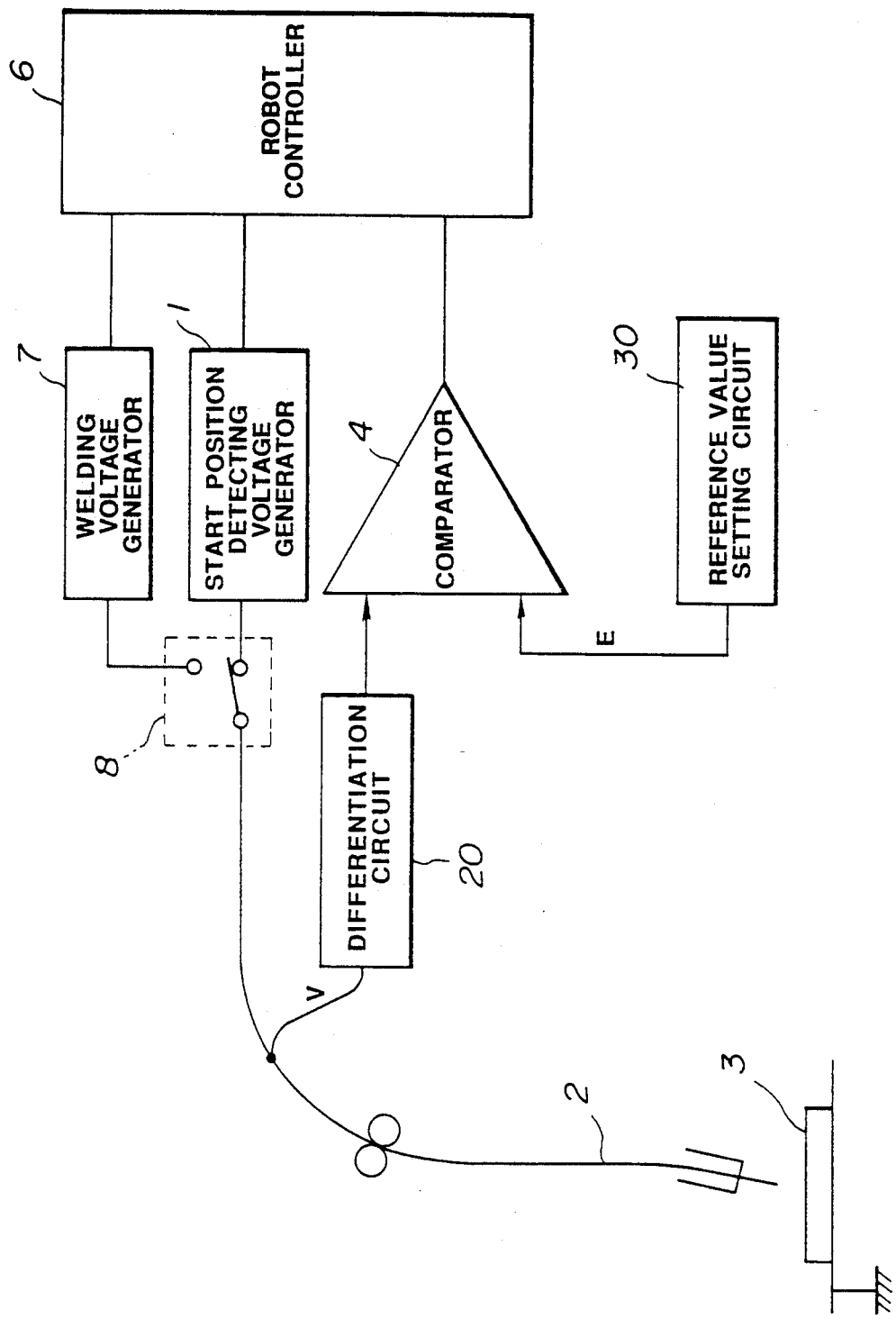
FIG. 3 is a block diagram of another embodiment of the present invention.

Shown in FIG. 3 is a second embodiment of the present invention in which the sampled voltage V is subjected at a differentiation circuit 20 to a differentiating operation with respect to time and its resultant differentiated value dV/dt is input to the comparison circuit 4. Further, a suitable reference value E for comparison is previously set in a reference value setting circuit 30 and is input to the comparison circuit 4. The comparison circuit 4 compares the differentiated value dV/dt with the reference voltage E and, when a relationship dV/dt > E is satisfied, outputs a start position detection signal.

With such an arrangement, the voltage V applied to the welding wire is subjected at the differentiation circuit 20 to the differentiating operation and, when its resultant differentiated value dV/dt exceeds the predetermined reference value E, the comparison circuit 4 outputs the start position detection signal. As a result, even when the impedance around the welding torch is changed and thus a voltage difference between the voltage before the welding torch comes into contact with the base material and the voltage after the welding torch comes into contact with the base material becomes small, a differentiated output can be obtained as long as a difference between the before-contact voltage and the after-contact voltage exists. Thus, even in such a case, when the reference value for comparison is set at a suitable level, the welding start position can be detected.

What is claimed is:

1. A welding start position detecting apparatus for welding robot wherein, while a predetermined voltage for detection of the welding start position is applied to a welding wire, the robot is driven to perform its searching operation of the welding start position on a base material, the applied voltage is compared with a predetermined reference voltage and, on the basis of a comparison result, a time point when the welding wire comes into contact with the welding start position on the base material is detected and, a shift between an actual welding start position found on the basis of angles of respective axes of the robot at the contact detection time point and a preset target welding start position is calculated to correct the position of the robot, said apparatus comprising:

reference voltage setting means for setting two different voltages of a first reference voltage having a higher sensitivity and a second reference voltage having a lower sensitivity as the predetermined reference voltage;

first welding start position detection means for comparing the applied voltage with the first reference voltage during a period after the searching operation is started until a predetermined time expires, for switching the first reference voltage to the second reference voltage when the applied voltage comes across a level of the first reference voltage to perform comparing operation of the applied voltage with the second reference voltage, and for detecting a time point when the applied voltage comes across a level of the second reference voltage as a time point when the welding wire comes into contact with the welding start position on the base material; and second welding start position detection means for comparing the applied voltage with the first reference voltage when the predetermined time expires while the applied voltage does not come across the level of the first reference voltage and for detecting a time point when the applied voltage comes across the level of the first reference voltage as the time point when the welding wire comes into contact with the welding start position on the base material.

2. A welding start position detecting apparatus for welding robot wherein, while a predetermined voltage for detection of the welding start position is applied to a welding wire, the robot is driven to perform its searching operation of the welding start position on a base material, a time point when the welding wire comes into contact with the base material is detected, and a shift between an actual welding start position found on the basis of angles of respective axes of the robot at the contact detection time point and a preset target weld starting position is calculated to correct the position of the robot, the apparatus comprising:

differentiating means for differentiating the applied voltage;

reference value setting means for setting a predetermined reference value for comparison; and comparison means for comparing an output of the differentiating means with the reference value set by the reference value setting means and for outputting a start position detection signal when the output of the differentiating means exceeds said set reference value.

* * * * *